United States Patent
Ohta et al.

(10) Patent No.: US 10,818,964 B2
(45) Date of Patent: Oct. 27, 2020

(54) COMPOSITE SOLID ELECTROLYTE

(71) Applicant: TOYOTA JIDOSHA KABUSHIKI KAISHA, Toyota-shi, Aichi-ken (JP)

(72) Inventors: Shingo Ohta, Numazu (JP); Hideyuki Yamamura, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 191 days.

(21) Appl. No.: 15/361,136

(22) Filed: Nov. 25, 2016

(65) Prior Publication Data

US 2017/0162902 A1 Jun. 8, 2017

(30) Foreign Application Priority Data

Dec. 7, 2015 (JP) ................. 2015-238899

(51) Int. Cl.
*H01M 10/0562* (2010.01)

(52) U.S. Cl.
CPC ......... *H01M 10/0562* (2013.01); *H01M 2300/0065* (2013.01); *H01M 2300/0071* (2013.01); *H01M 2300/0088* (2013.01); *H01M 2300/0091* (2013.01)

(58) Field of Classification Search
CPC ..... H01M 10/0562; H01M 2300/0065; H01M 2300/0071; H01M 2300/0088; H01M 2300/0091
See application file for complete search history.

(56) References Cited

U.S. PATENT DOCUMENTS

2013/0177821 A1 7/2013 Tsuchida et al.
2014/0072875 A1* 3/2014 Uchiyama ........... H01M 4/0416
429/231.1
(Continued)

FOREIGN PATENT DOCUMENTS

CN 103125044 A 5/2013
CN 103548186 A 1/2014
(Continued)

OTHER PUBLICATIONS

E. Rangasamy et al. "A high conductivity oxide-sulfide composite lithium superionic conductor," Journal of Materials Chemistry A, Jan. 1, 2014, pp. 4111-pp. 4116, vol. 2, No. 12.

*Primary Examiner* — Victoria H Lynch
(74) *Attorney, Agent, or Firm* — Oliff PLC

(57) ABSTRACT

A composite solid electrolyte with excellent formability and chemical stability and high lithium ion conductivity. The composite solid electrolyte may comprise an oxide-based solid electrolyte and a sulfide-based solid electrolyte, wherein the oxide-based solid electrolyte is $(Li_{7-3Y-Z}, Al_Y)(La_3)(Zr_{2-Z}, M_Z)O_{12}$ (where M is at least one element selected from the group consisting of Nb and Ta; Y is a number in a range of $0 \leq Y < 0.22$; and Z is a number in a range of $0 \leq Z \leq 2$), and wherein the sulfide-based solid electrolyte is $VLiX-(1-V)((1-W)Li_2S-WP_2S_5)$ (where X is a halogen element; V is a number in a range of $0 < V < 1$; and W is a number in a range of $0.125 \leq W \leq 0.30$).

2 Claims, 2 Drawing Sheets

(56) References Cited

U.S. PATENT DOCUMENTS

| | | | |
|---|---|---|---|
| 2014/0141341 A1* | 5/2014 | Ohtomo | H01M 10/0562 |
| | | | 429/319 |
| 2014/0162113 A1 | 6/2014 | Ohta et al. | |
| 2015/0024280 A1 | 1/2015 | Uchiyama | |
| 2016/0344032 A1* | 11/2016 | Shibata | H01M 4/621 |

FOREIGN PATENT DOCUMENTS

| | | | |
|---|---|---|---|
| JP | 2010-282948 A | 12/2010 |
| JP | 2011-081915 A | 4/2011 |
| JP | 2014-089971 A | 5/2014 |
| JP | 2014-130733 A | 7/2014 |
| JP | 2014-216117 A | 11/2014 |
| WO | 2010/125467 A1 | 11/2010 |
| WO | 2012/176808 A1 | 12/2012 |

\* cited by examiner

COMPOSITE SOLID ELECTROLYTE

TECHNICAL FIELD

This disclosure relates to a composite solid electrolyte.

BACKGROUND

In the field of all-solid-state batteries, there has been an attempt to improve the performance of all-solid-state batteries, focusing on an interface between an electrode active material and a solid electrolyte material.

For example, a solid electrolyte is disclosed in Patent Literature 1, which comprises a sulfide solid electrolyte with excellent formability at room temperature and an oxide solid electrolyte with excellent chemical stability.

Patent Literature 1: Japanese Patent Application Laid-Open (JP-A) No. 2011-081915
Patent Literature 2: JP-A No. 2014-089971
Patent Literature 3: International Publication No. WO2012-176808

SUMMARY

However, prior-art composite solid electrolytes as disclosed in Patent Literature 1 have a problem of very low lithium ion conductivity.

The disclosed embodiments were achieved in light of the above circumstance. An object of the disclosed embodiments is to provide a composite solid electrolyte with excellent formability and chemical stability and high lithium ion conductivity.

In a first embodiment, there is provided a composite solid electrolyte comprising an oxide-based solid electrolyte and a sulfide-based solid electrolyte, wherein the oxide-based solid electrolyte is $(Li_{7-3Y-Z}, Al_Y)(La_3)(Zr_{2-Z}, M_Z)O_{12}$ (where M is at least one element selected from the group consisting of Nb and Ta; Y is a number in a range of $0 \leq Y < 0.22$; and Z is a number in a range of $0 \leq Z \leq 2$), and wherein the sulfide-based solid electrolyte is $VLiX-(1-V)((1-W)Li_2S-WP_2S_5)$ (where X is a halogen element; V is a number in a range of $0 < V < 1$; and W is a number in a range of $0.125 \leq W \leq 0.30$).

The oxide-based solid electrolyte may be $(Li_{7-3Y-Z}, Al_Y)(La_3)(Zr_{2-Z}, M_Z)O_{12}$ (where M is at least one element selected from the group consisting of Nb and Ta; Y is a number in a range of $0 \leq Y < 0.22$; and Z is a number in a range of $0 < Z \leq 2$).

The sulfide-based solid electrolyte may be at least one selected from the group consisting of $0.2LiI-0.8(0.75Li_2S-0.25P_2S_5)$ and $0.2LiBr-0.8(0.75Li_2S-0.25P_2S_5)$.

The mixing ratio of the sulfide-based solid electrolyte in the composite solid electrolyte may be 5 volume % or more and 50 volume % or less.

According to the disclosed embodiments, a composite solid electrolyte with excellent formability and chemical stability and high lithium ion conductivity can be obtained.

DETAILED DESCRIPTION

Figure 1:
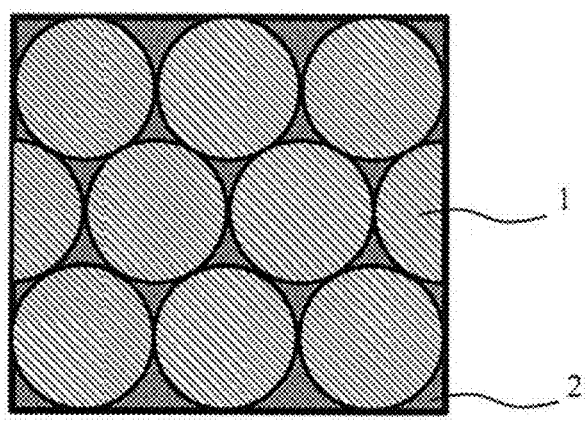
FIG. 1 is a schematic view of an example of the composite solid electrolyte according to an embodiment.

The composite solid electrolyte according to the disclosed embodiments is a composite solid electrolyte comprising an oxide-based solid electrolyte and a sulfide-based solid electrolyte, wherein the oxide-based solid electrolyte is $(Li_{7-3Y-Z}, Al_Y)(La_3)(Zr_{2-Z}, M_Z)O_{12}$ (where M is at least one element selected from the group consisting of Nb and Ta; Y is a number in a range of $0 \leq Y < 0.22$; and Z is a number in a range of $0 \leq Z \leq 2$), and wherein the sulfide-based solid electrolyte is $VLiX-(1-V)((1-W)Li_2S-WP_2S_5)$ (where X is a halogen element; V is a number in a range of $0 < V < 1$; and W is a number in a range of $0.125 \leq W \leq 0.30$).

A sulfide-based solid electrolyte can be easily formed at room temperature and has high lithium ion conductivity. However, it may produce hydrogen sulfide by exposure to the air.

Meanwhile, an oxide-based solid electrolyte is stable in the air; however, it needs heating at a temperature of close to 1000° C. to be formed.

Therefore, a composite solid electrolyte has been proposed, which is provided with both high lithium ion conductivity and easy formability at room temperature, by the use of a highly-flexible sulfide-based solid electrolyte for the boundaries of the single particles of the oxide-based solid electrolyte.

However, for prior-art composite solid electrolytes, activation energy at the time of charge transfer of an interface between the oxide-based solid electrolyte and the sulfide-based solid electrolyte is very high. That is, resistance at the interface is very high. Accordingly, there is a problem in that lithium ion transfer at the interface between the oxide-based solid electrolyte and the sulfide-based solid electrolyte is inhibited, and very low lithium ion conductivity is obtained.

The reason for this is supposed as follows: in the combination of the oxide-based and sulfide-based solid electrolytes used for prior-art composite solid electrolytes, a chemical reaction occurs between the oxide-based solid electrolyte and the sulfide-based solid electrolyte to form a high-resistance interface layer.

It was found that higher lithium conductivity than that of prior-art composite solid electrolytes can be obtained by use of the sulfide-based solid electrolyte containing LiX (where X is a halogen element).

The reason for this is thought as follows: by the use of the sulfide-based solid electrolyte containing LiX, the activation energy at the time of charge transfer at the interface between the oxide-based solid electrolyte and the sulfide-based solid electrolyte is decreased, and a chemical reaction at the interface between the oxide-based solid electrolyte and the sulfide-based solid electrolyte is less likely to occur; therefore, the resistance at the interface is decreased, and high lithium ion conductivity is obtained.

The composite solid electrolyte according to the disclosed embodiments has excellent formability; therefore, a battery can be formed in a room temperature or low temperature condition, and battery production becomes easy.

Also, the composite solid electrolyte according to the disclosed embodiments has excellent chemical stability; therefore, the production of hydrogen sulfide can be prevented as much as possible.

Also, the composite solid electrolyte according to the disclosed embodiments has high lithium ion conductivity; therefore, a high-power battery can be produced.

FIG. 1 is a schematic view of an example of the composite solid electrolyte according to an embodiment.

As shown in FIG. 1, the composite solid electrolyte that contains an oxide-based solid electrolyte 1 having excellent chemical stability and a sulfide-based solid electrolyte 2 having excellent formability at room temperature and containing LiX (where X is a halogen element) at a given ratio, can form a good interface between the oxide-based solid electrolyte 1 and the sulfide-based solid electrolyte 2, and ion paths are appropriately obtained; therefore, desired lithium ion conductivity can be obtained.

The lithium ion conductivity of the composite solid electrolyte according to the disclosed embodiments is not particularly limited. For example, it may be $1 \times 10^{-6}$ S/cm or more at ordinary temperature.

In the disclosed embodiments, the average particle diameter of particles is calculated by a general method. An example of the method for calculating the average particle diameter of particles is as follows. First, for a particle shown in an image taken at an appropriate magnification (e.g., 50,000× to 1,000,000×) with a transmission electron microscope (hereinafter referred to as TEM) or a scanning electron microscope (hereinafter referred to as SEM), the diameter is calculated on the assumption that the particle is spherical. Such a particle diameter calculation by TEM or SEM observation is carried out on 200 to 300 particles of the same type, and the average of the particles is determined as the average particle diameter.

[Oxide-Based Solid Electrolyte]

The oxide-based solid electrolyte is not particularly limited, as long as it is $(Li_{7-3Y-Z}, Al_Y)(La_3)(Zr_{2-Z}, M_Z)O_{12}$ (where M is at least one element selected from the group consisting of Nb and Ta; Y is a number in a range of $0 \leq Y < 0.22$; Z is a number in a range of $0 \leq Z \leq 2$). From the viewpoint of increasing lithium ion conductivity, Z may be in a range of $0 < Z \leq 2$.

As the oxide-based solid electrolyte, examples include $Li_{6.4}La_3Zr_{1.4}Nb_{0.6}O_{12}$, $Li_7La_3Zr_2O_{12}$, $Li_{6.75}La_3Zr_{1.75}Nb_{0.25}O_{12}$, $Li_5La_3Nb_2O_{12}$, $(Li_{6.4}Al_{0.2})La_3Zr_2O_{12}$ and $(Li_{6.15}Al_{0.2})La_3Zr_{1.75}Nb_{0.25}O_{12}$. Of them, the oxide-based electrolyte may be $Li_{6.4}La_3Zr_{1.4}Nb_{0.6}O_{12}$.

The oxide-based solid electrolyte may be in a particle form, for example. The average particle diameter of the oxide-based solid electrolyte in a particle form is not particularly limited, and it may be in a range of from 1 to 10 μm.

[Sulfide-Based Solid Electrolyte]

The sulfide-based solid electrolyte is not particularly limited, as long as it is $VLiX-(1-V)((1-W)Li_2S-WP_2S_5)$ (where X is a halogen element; V is a number in a range of $0 < V < 1$; and W is a number in a range of $0.125 \leq W \leq 0.30$).

With respect to the total of $Li_2S$ and $P_2S_5$, the ratio of $P_2S_5$ may be in a range of from 12.5 mol % to 30 mol %; it may be in a range of from 20 mol % to 30 mol %; and it may be 25 mol %.

For the $Li_2S$—$P_2S_5$-based, sulfide-based solid electrolyte material, it is known that the material in a crystallized glass state shows high lithium ion conductivity, when the ratio of $P_2S_5$ is in a range of from 12.5 mol % to 30 mol % with respect to the total of $Li_2S$ and $P_2S_5$.

A crystallized glass is not a perfect crystal; therefore, it is difficult to absolutely identify the crystal structure. However, when a lithium halide (LiX) is dissolved in the $Li_2S$—$P_2S_5$-based, sulfide-based solid electrolyte material in the above compositional range, there is a tendency of characteristic peaks to appear by X-ray diffraction (XRD) measurement, which are similar to a high lithium conducting phase called LGPS ($Li_{10}GeP_2S_{12}$).

From the above facts, it is thought that the lithium halide has an effect of turning the crystal structure of the sulfide-based solid electrolyte material into a high lithium conducting phase. Therefore, it is thought that a composite solid electrolyte with high lithium ion conductivity can be obtained by the use of the sulfide-based solid electrolyte material in the above compositional range.

In LiX, X is a halogen element. As X, examples include F, Cl, Br and I. X may be Cl, Br or I. Also, X may be Br or I. This is because a composite solid electrolyte with high lithium ion conductivity can be obtained.

The ratio of LiX in the sulfide-based solid electrolyte used in the disclosed embodiments is not particularly limited. For example, it may be more than 14 mol % and less than 30 mol %; it may be 15 mol % or more and 25 mol % or less; and it may be 20 mol %.

As the sulfide-based solid electrolyte, examples include $0.2LiBr-0.8(0.75Li_2S-0.25P_2S_5)$ and $0.2LiI-0.8(0.75Li_2S-0.25P_2S_5)$.

The sulfide-based solid electrolyte may be in a particle form, for example. The average particle diameter of the sulfide-based solid electrolyte in a particle form is not particularly limited, and it may be in a range of from 0.1 to 10 μm, for example.

The method for producing the sulfide-based solid electrolyte is not particularly limited. Examples thereof include the following method: first, a raw material composition containing LiX, $Li_2S$ and $P_2S_5$ is prepared; next, mechanical milling is carried out on the raw material composition, thereby synthesizing a sulfide glass that has LiX and an ion conductor having Li, P and S; and the sulfide glass is heated at a temperature equal to or higher than the crystallization temperature, thereby obtaining the sulfide-based solid electrolyte.

[Method for Producing Composite Solid Electrolyte]

The method for producing the composite solid electrolyte according to the disclosed embodiments is not particularly limited. For example, the composite solid electrolyte can be obtained by mixing the oxide-based solid electrolyte and the sulfide-based solid electrolyte and compacting the resulting powder mixture.

The mixing ratio of the sulfide-based solid electrolyte in the composite solid electrolyte is not particularly limited. From the viewpoint of increasing formability and chemical stability, it may be 5 volume % or more and less than 100 volume %. From the viewpoint of reducing a hydrogen sulfide gas yield, it may be 5 volume % or more and 50 volume % or less. From the viewpoint of obtaining desired lithium ion conductivity, it may be 10 volume % or more and 40 volume % or less.

The mixing method is not particularly limited. When the mixing is carried out using a mortar, examples include mixing with applying the mechanical energy of a ball mill, vibrating mill, turbo mill, mechanofusion, disk mill, etc.

The mixing time is not particularly limited. For example, when the mixing is carried out using a vibrating mill, it may be 1 to 60 minutes.

The mixing may be either wet mixing or dry mixing.

EXAMPLES

Examples 1 to 5, Comparative Examples 1 and 2

[Synthesis of Oxide-Based Solid Electrolyte]

As an oxide-based solid electrolyte, $Li_{6.4}La_3Zr_{1.4}Nb_{0.6}O_{12}$ was synthesized.

$Li_{6.4}La_3Zr_{1.4}Nb_{0.6}O_{12}$ was synthesized in a temperature range of from 500 to 1300° C., using $LiOH(H_2O)$ (manufactured by: Sigma-Aldrich), $La(OH)_3$ (manufactured by: Kojundo Chemical Laboratory Co., Ltd.), $ZrO_2$ (manufactured by: Kojundo Chemical Laboratory Co., Ltd.) and $Nb_2O_5$ (manufactured by: Kojundo Chemical Laboratory Co., Ltd.) as starting materials. It was confirmed by SEM that the average particle diameter of $Li_{6.4}La_3Zr_{1.4}Nb_{0.6}O_{12}$ is about 10 μm.

[Synthesis of Sulfide-Based Solid Electrolyte]

As a sulfide-based solid electrolyte, $0.2LiI-0.8(0.75Li_2S-0.25P_2S_5)$ was synthesized.

For the synthesis of the sulfide-based solid electrolyte, lithium sulfide ($Li_2S$, manufactured by: Nippon Chemical Industrial Co., Ltd.), diphosphorus pentasulfide ($P_2S_5$, manufactured by: Aldrich) and lithium iodide (LiI, manufactured by: Aldrich) were used as starting materials.

Next, $Li_2S$ and $P_2S_5$ were weighted at a molar ratio of $75Li_2S \cdot 25P_2S_5$.

Next, LiI was weighed so that the ratio of LiI becomes 20 mol %.

The weighed starting materials were mixed for five minutes with an agate mortar. Then, 2 g of the mixture was put in the container (45 cm$^3$, made of $ZrO_2$) of a planetary ball mill. Dehydrated heptane (moisture content 30 ppm or less, 4 g) was put in the container. In addition, $ZrO_2$ balls (diameter 5 mm, 53 g) were put in the container, and the container was absolutely hermetically closed. This container was installed in the planetary ball mill (product name: P7; manufactured by: Fritsch) and mechanical milling was carried out at a plate rotational frequency of 500 rpm for 40 hours. Then, the mixture was dried at 100° C. for removal of the heptane, thereby obtaining a sulfide glass.

Then, 0.5 g of the sulfide glass was put in a glass tube. The glass tube was put in a hermetically-closed container made of SUS. The hermetically-closed container was heated at 190° C. for 10 hours, thereby obtaining $0.2LiI-0.8(0.75Li_2S-0.25P_2S_5)$.

[Production of Composite Solid Electrolyte]

Next, $Li_{6.4}La_3Zr_{1.4}Nb_{0.6}O_{12}$ and $0.2LiI-0.8(0.75Li_2S-0.25P_2S_5)$ were mixed for 30 minutes with a vibrating mill so that the volume fraction of $0.2LiI-0.8(0.75Li_2S-0.25P_2S_5)$ becomes 0% (Comparative Example 1), 10% (Example 1), 20% (Example 2), 30% (Example 3), 40% (Example 4), 50% (Example 5) and 100% (Comparative Example 2). The thus-obtained mixture was put in a metal mold and subjected to powder-compacting at a pressure of 1 ton/cm$^2$ ($\approx$98 MPa) at room temperature, thereby producing a composite solid electrolyte.

[SEM Image Observation]

Cross-sectional SEM observation of the composite solid electrolyte was carried out by the following process.

First, a fracture cross-section of the composite solid electrolyte was treated by a cross sectional polisher (CP) manufactured by JEOL Ltd., at an accelerating voltage of 4 kV for a treatment time of 8 hours, thereby producing an observational surface. Then, the sectional texture was observed with a field emission scanning electron microscope (product name: FE-SEM; manufactured by: Hitachi High-Technologies Corporation), and the element distribution state was checked by energy dispersive X-ray analysis (EDX).

Figure 2:
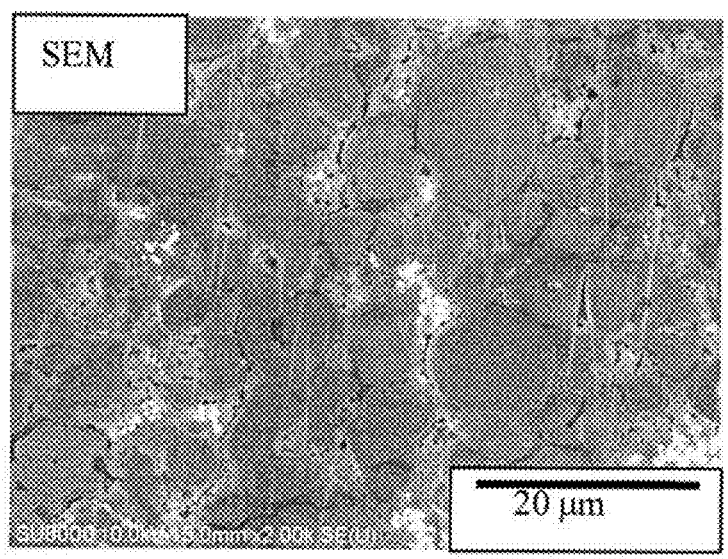
FIG. 2 is a sectional SEM image of a composite solid electrolyte obtained in Example 3.

FIG. 2 shows a sectional SEM image of the composite solid electrolyte obtained in Example 3.

Figure 3:
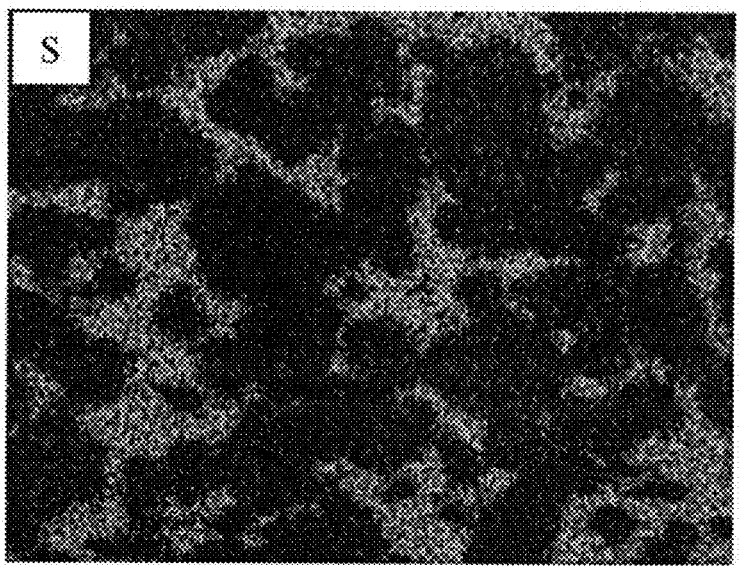
FIG. 3 is an S element distribution map obtained by EDX of the composite solid electrolyte of Example 3.

FIG. 3 shows an S element distribution map obtained by EDX of the composite solid electrolyte of Example 3.

The S element distribution map in FIG. 3 corresponds to the distribution of the sulfide-based solid electrolyte in the composite solid electrolyte. From the map in FIG. 3, it is clear that the sulfide-based solid electrolyte is mainly present at the boundaries of the particles of the oxide-based solid electrolyte. Therefore, it is clear that there are almost no conducting paths between the particles of the sulfide-based solid electrolyte. Also, the S element distribution map shows no diffusion of the S element into the whole composite solid electrolyte. Therefore, it is clear that there is not a significant reaction of the sulfide-based solid electrolyte with the oxide-based solid electrolyte, and the sulfide-based solid electrolyte is stably present.

Example 6

A composite solid electrolyte was produced in the same manner as Example 3, except that $Li_7La_3Zr_2O_{12}$ was used as the oxide-based solid electrolyte in place of $Li_{6.4}La_3Zr_{1.4}Nb_{0.6}O_{12}$.

$Li_7La_3Zr_2O_{12}$ was synthesized in a temperature range of from 500 to 1300° C., using $LiOH(H_2O)$ (manufactured by: Sigma-Aldrich), $La(OH)_3$ (manufactured by: Kojundo Chemical Laboratory Co., Ltd.) and $ZrO_2$ (manufactured by: Kojundo Chemical Laboratory Co., Ltd.) as starting materials. It was confirmed by SEM that the average particle diameter of $Li_7La_3Zr_2O_{12}$ is about 10 μm.

Example 7

A composite solid electrolyte was produced in the same manner as Example 3, except that $Li_{6.75}La_3Zr_{1.75}Nb_{0.25}O_{12}$ was used as the oxide-based solid electrolyte in place of $Li_{6.4}La_3Zr_{1.4}Nb_{0.6}O_{12}$.

$Li_{6.75}La_3Zr_{1.75}Nb_{0.25}O_{12}$ was synthesized in a temperature range of from 500 to 1300° C., using $LiOH(H_2O)$ (manufactured by: Sigma-Aldrich), $La(OH)_3$ (manufactured by: Kojundo Chemical Laboratory Co., Ltd.), $ZrO_2$ (manufactured by: Kojundo Chemical Laboratory Co., Ltd.) and $Nb_2O_5$ (manufactured by: Kojundo Chemical Laboratory Co., Ltd.) as starting materials. It was confirmed by SEM that the average particle diameter of $Li_{6.75}La_3Zr_{1.75}Nb_{0.25}O_{12}$ is about 10 μm.

Example 8

A composite solid electrolyte was produced in the same manner as Example 3, except that $Li_5La_3Nb_2O_{12}$ was used as the oxide-based solid electrolyte in place of $Li_{6.4}La_3Zr_{1.4}Nb_{0.6}O_{12}$.

$Li_5La_3Nb_2O_{12}$ was synthesized in a temperature range of from 500 to 1300° C., using $LiOH(H_2O)$ (manufactured by: Sigma-Aldrich), $La(OH)_3$ (manufactured by: Kojundo Chemical Laboratory Co., Ltd.) and $Nb_2O_5$ (manufactured by: Kojundo Chemical Laboratory Co., Ltd.) as starting materials. It was confirmed by SEM that the average particle diameter of $Li_5La_3Nb_2O_{12}$ is about 10 μm.

Example 9

A composite solid electrolyte was produced in the same manner as Example 3, except that $(Li_{6.4}Al_{0.2})La_3Zr_2O_{12}$ was used as the oxide-based solid electrolyte in place of $Li_{6.4}La_3Zr_{1.4}Nb_{0.6}O_{12}$.

$(Li_{6.4}Al_{0.2})La_3Zr_2O_{12}$ was synthesized in a temperature range of from 500 to 1300° C., using $LiOH(H_2O)$ (manufactured by: Sigma-Aldrich), $\gamma\text{-}Al_2O_3$ (manufactured by: Kojundo Chemical Laboratory Co., Ltd.), $La(OH)_3$ (manufactured by: Kojundo Chemical Laboratory Co., Ltd.) and $ZrO_2$ (manufactured by: Kojundo Chemical Laboratory Co., Ltd.) as starting materials. It was confirmed by SEM that the average particle diameter of $(Li_{6.4}Al_{0.2})La_3Zr_2O_{12}$ is about 10 μm.

Example 10

A composite solid electrolyte was produced in the same manner as Example 3, except that $(Li_{6.15}Al_{0.2})La_3Zr_{1.75}Nb_{0.25}O_{12}$ was used as the oxide-based solid electrolyte in place of $Li_{6.4}La_3Zr_{1.4}Nb_{0.6}O_{12}$.

$(Li_{6.15}Al_{0.2})La_3Zr_{1.75}Nb_{0.25}O_{12}$ was synthesized in a temperature range of from 500 to 1300° C., using $LiOH(H_2O)$ (manufactured by: Sigma-Aldrich), $\gamma\text{-}Al_2O_3$ (manufactured by: Kojundo Chemical Laboratory Co., Ltd.), $La(OH)_3$ (manufactured by: Kojundo Chemical Laboratory Co., Ltd.), $ZrO_2$ (manufactured by: Kojundo Chemical Laboratory Co., Ltd.) and $Nb_2O_5$ (manufactured by: Kojundo Chemical Laboratory Co., Ltd.) as starting materials. It was confirmed by SEM that the average particle diameter of $(Li_{6.15}Al_{0.2})La_3Zr_{1.75}Nb_{0.25}O_{12}$ is about 10 μm.

Example 11

A composite solid electrolyte was produced in the same manner as Example 3, except that $Li_{6.75}La_3Zr_{1.75}Nb_{0.25}O_{12}$ was used as the oxide-based solid electrolyte in place of $Li_{6.4}La_3Zr_{1.4}Nb_{0.6}O_{12}$, and $0.2LiBr\text{-}0.8(0.75Li_2S\text{-}0.25P_2S_5)$ was used as the sulfide-based solid electrolyte in place of $0.2LiI\text{-}0.8(0.75Li_2S\text{-}0.25P_2S_5)$.

Comparative Example 3

A composite solid electrolyte was produced in the same manner as Example 3, except that $0.75Li_2S\text{-}0.25P_2S_5$ was used as the sulfide-based solid electrolyte in place of $0.2LiI\text{-}0.8(0.75Li_2S\text{—}0.25P_2S_5)$.

Comparative Examples 4 to 10

A composite solid electrolyte was produced in the same manner as Example 1, except that $Li_7La_3Zr_2O_{12}$ was used as the oxide-based solid electrolyte in place of $Li_{6.4}La_3Zr_{1.4}Nb_{0.6}O_{12}$; $0.75Li_2S\text{-}0.25P_2S_5$ was used as the sulfide-based solid electrolyte in place of $0.2LiI\text{-}0.8(0.75Li_2S\text{-}0.25P_2S_5)$; and $Li_7La_3Zr_2O_{12}$ and $0.75Li_2S\text{-}0.25P_2S_5$ were mixed so that the volume fraction of $0.75Li_2S\text{-}0.25P_2S_5$ becomes 0% (Comparative Example 4), 12% (Comparative Example 5), 22% (Comparative Example 6), 26% (Comparative Example 7), 31% (Comparative Example 8), 40% (Comparative Example 9) and 100% (Comparative Example 10).

[Lithium Ion Conductivity Measurement]

Lithium ion conductivity measurement was carried out on the composite solid electrolytes obtained in Examples 1 to 11 and Comparative Examples 1 to 10. The measurement was carried out by a AC impedance measurement method, using potentiostat 1470 (manufactured by: Solartron) and impedance analyzer FRA1255B (manufactured by: Solartron) in the following conditions: a voltage swing of 20 mV, a measuring frequency (f) of 0.1 Hz to 1 MHz, a measurement temperature of 25° C. and a confining pressure of 6 N. Lithium ion conductivities obtained by the AC impedance measurement are shown in FIG. 4 and Table 1.

Figure 4:
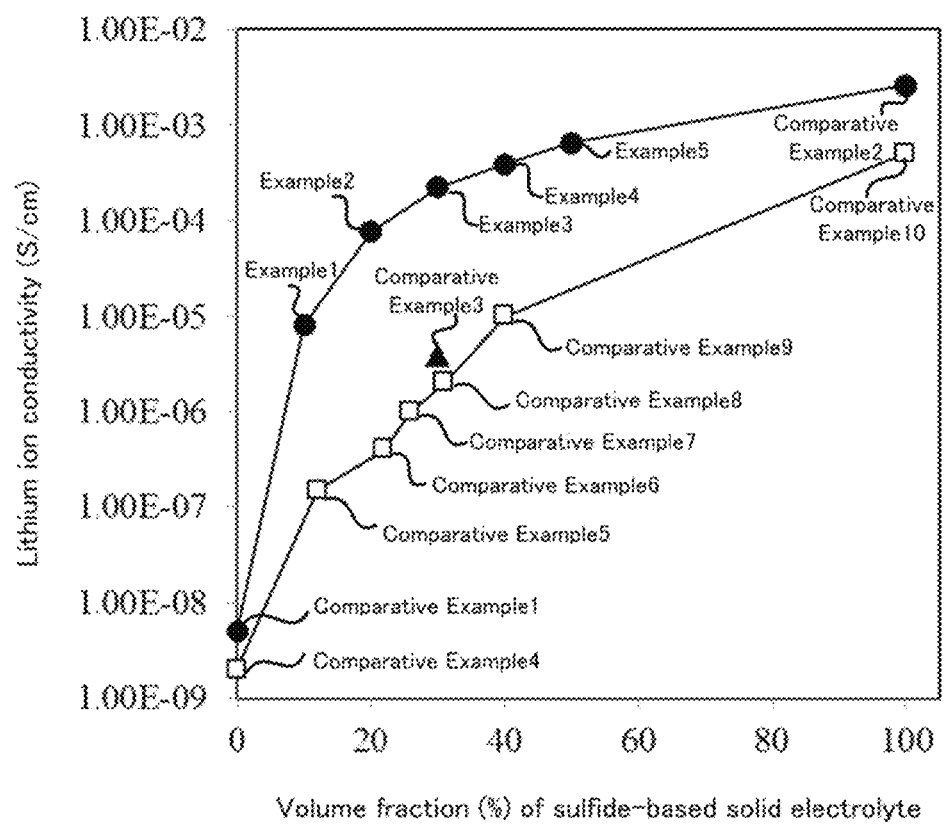
FIG. 4 is a graph with lithium ion conductivity on the vertical axis and, on the horizontal axis, the volume fraction of a sulfide-based solid electrolyte when the total content of the sulfide-based solid electrolyte and an oxide-based solid electrolyte is determined as 100 volume %.

FIG. 4 is a graph for the composite solid electrolytes of Examples 1 to 5 and Comparative Examples 1 to 10, with lithium ion conductivity (S/cm) on the vertical axis and, on the horizontal axis, the volume fraction (%) of the sulfide-based solid electrolyte when the total content of the sulfide-based solid electrolyte and the oxide-based solid electrolyte is determined as 100 volume %.

TABLE 1

| | Composite of oxide-based solid electrolyte | Composite of sulfide-based solid electrolyte | Volume fraction (%) of oxide-based solid electrolyte | Volume fraction (%) of sulfide-based solid electrolyte | Lithium ion conductivity (S/cm) |
|---|---|---|---|---|---|
| Comparative Example 1 | $Li_{6.4}La_3Zr_{1.4}Nb_{0.6}O_{12}$ | $0.2LiI\text{-}0.8(0.75Li_2S\text{-}0.25P_2S_5)$ | 100 | 0 | $5.00 \times 10^{-9}$ |
| Example 1 | $Li_{6.4}La_3Zr_{1.4}Nb_{0.6}O_{12}$ | $0.2LiI\text{-}0.8(0.75Li_2S\text{-}0.25P_2S_5)$ | 90 | 10 | $8.11 \times 10^{-6}$ |
| Example 2 | $Li_{6.4}La_3Zr_{1.4}Nb_{0.6}O_{12}$ | $0.2LiI\text{-}0.8(0.75Li_2S\text{-}0.25P_2S_5)$ | 80 | 20 | $7.58 \times 10^{-5}$ |
| Example 3 | $Li_{6.4}La_3Zr_{1.4}Nb_{0.6}O_{12}$ | $0.2LiI\text{-}0.8(0.75Li_2S\text{-}0.25P_2S_5)$ | 70 | 30 | $2.20 \times 10^{-4}$ |
| Example 4 | $Li_{6.4}La_3Zr_{1.4}Nb_{0.6}O_{12}$ | $0.2LiI\text{-}0.8(0.75Li_2S\text{-}0.25P_2S_5)$ | 60 | 40 | $3.87 \times 10^{-4}$ |
| Example 5 | $Li_{6.4}La_3Zr_{1.4}Nb_{0.6}O_{12}$ | $0.2LiI\text{-}0.8(0.75Li_2S\text{-}0.25P_2S_5)$ | 50 | 50 | $6.47 \times 10^{-4}$ |
| Comparative Example 2 | $Li_{6.4}La_3Zr_{1.4}Nb_{0.6}O_{12}$ | $0.2LiI\text{-}0.8(0.75Li_2S\text{-}0.25P_2S_5)$ | 0 | 100 | $2.60 \times 10^{-3}$ |
| Example 6 | $Li_7La_3Zr_2O_{12}$ | $0.2LiI\text{-}0.8(0.75Li_2S\text{-}0.25P_2S_5)$ | 70 | 30 | $4.80 \times 10^{-5}$ |
| Example 7 | $Li_{6.75}La_3Zr_{1.75}Nb_{0.25}O_{12}$ | $0.2LiI\text{-}0.8(0.75Li_2S\text{-}0.25P_2S_5)$ | 70 | 30 | $2.44 \times 10^{-4}$ |
| Example 8 | $Li_5La_3Nb_2O_{12}$ | $0.2LiI\text{-}0.8(0.75Li_2S\text{-}0.25P_2S_5)$ | 70 | 30 | $5.30 \times 10^{-5}$ |
| Example 9 | $(Li_{6.4}Al_{0.2})La_3Zr_2O_{12}$ | $0.2LiI\text{-}0.8(0.75Li_2S\text{-}0.25P_2S_5)$ | 70 | 30 | $1.25 \times 10^{-5}$ |
| Example 10 | $(Li_{6.15}Al_{0.2})La_3Zr_{1.75}Nb_{0.25}O_{12}$ | $0.2LiI\text{-}0.8(0.75Li_2S\text{-}0.25P_2S_5)$ | 70 | 30 | $1.90 \times 10^{-4}$ |
| Example 11 | $Li_{6.75}La_3Zr_{1.75}Nb_{0.25}O_{12}$ | $0.2LiBr\text{-}0.8(0.75Li_2S\text{-}0.25P_2S_5)$ | 70 | 30 | $1.80 \times 10^{-4}$ |
| Comparative Example 3 | $Li_{6.4}La_3Zr_{1.4}Nb_{0.6}O_{12}$ | $0.75Li_2S\text{-}0.25P_2S_5$ | 70 | 30 | $4.00 \times 10^{-6}$ |
| Comparative Example 4 | $Li_7La_3Zr_2O_{12}$ | $0.75Li_2S\text{-}0.25P_2S_5$ | 100 | 0 | $2.00 \times 10^{-9}$ |
| Comparative Example 5 | $Li_7La_3Zr_2O_{12}$ | $0.75Li_2S\text{-}0.25P_2S_5$ | 88 | 12 | $1.50 \times 10^{-7}$ |

TABLE 1-continued

| | Composite of oxide-based solid electrolyte | Composite of sulfide-based solid electrolyte | Volume fraction (%) of oxide-based solid electrolyte | Volume fraction (%) of sulfide-based solid electrolyte | Lithium ion conductivity (S/cm) |
|---|---|---|---|---|---|
| Comparative Example 6 | $Li_7La_3Zr_2O_{12}$ | $0.75Li_2S\text{-}0.25P_2S_5$ | 78 | 22 | $4.00 \times 10^{-7}$ |
| Comparative Example 7 | $Li_7La_3Zr_2O_{12}$ | $0.75Li_2S\text{-}0.25P_2S_5$ | 74 | 26 | $1.00 \times 10^{-6}$ |
| Comparative Example 8 | $Li_7La_3Zr_2O_{12}$ | $0.75Li_2S\text{-}0.25P_2S_5$ | 69 | 31 | $2.00 \times 10^{-6}$ |
| Comparative Example 9 | $Li_7La_3Zr_2O_{12}$ | $0.75Li_2S\text{-}0.25P_2S_5$ | 60 | 40 | $1.00 \times 10^{-9}$ |
| Comparative Example 10 | $Li_7La_3Zr_2O_{12}$ | $0.75Li_2S\text{-}0.25P_2S_5$ | 0 | 100 | $5.0 \times 10^{-4}$ |

As shown in Table 1, the lithium ion conductivities of the composite solid electrolytes are as follows: $8.11 \times 10^{-6}$ S/cm in Example 1; $7.58 \times 10^{-5}$ S/cm in Example 2; $2.20 \times 10^{-4}$ S/cm in Example 3; $3.87 \times 10^{-4}$ S/cm in Example 4; $6.47 \times 10^{-4}$ S/cm in Example 5; $4.80 \times 10^{-5}$ S/cm in Example 6; $2.44 \times 10^{-4}$ S/cm in Example 7; $5.30 \times 10^{-5}$ S/cm in Example 8; $1.25 \times 10^{-5}$ S/cm in Example 9; $1.90 \times 10^{-4}$ S/cm in Example 10; $1.80 \times 10^{-4}$ S/cm in Example 11; $5.00 \times 10^{-9}$ S/cm in Comparative Example 1; $2.60 \times 10^{-3}$ S/cm in Comparative Example 2; $4.00 \times 10^{-6}$ S/cm in Comparative Example 3; $2.00 \times 10^{-9}$ S/cm in Comparative Example 4; $1.50 \times 10^{-7}$ S/cm in Comparative Example 5; $4.00 \times 10^{-7}$ S/cm in Comparative Example 6; $1.00 \times 10^{-6}$ S/cm in Comparative Example 7; $2.00 \times 10^{-6}$ S/cm in Comparative Example 8; $1.00 \times 10^{-5}$ S/cm in Comparative Example 9; and $5.0 \times 10^{-4}$ S/cm in Comparative Example 10.

As shown in Table 1 and FIG. 4, it is clear that the composite solid electrolyte according to the disclosed embodiments, which is such a composite solid electrolyte that the volume fraction of the sulfide-based solid electrolyte containing the lithium halide is more than 0% and less than 100%, has higher lithium ion conductivity compared to a prior-art composite solid electrolyte using a sulfide-based solid electrolyte having the same volume and not containing a lithium halide.

Also, as shown in Table 1 and FIG. 4, as a result of comparing the lithium ion conductivities of the composite solid electrolytes of Example 1 and Comparative Example 5, in both of which the volume fraction of the sulfide-based solid electrolyte is about 10%, it is clear that the lithium ion conductivity of Example 1 is 54 times higher than Comparative Example 5.

As a result of comparing the lithium ion conductivities of the composite solid electrolytes of Example 2 and Comparative Example 6, in both of which the volume fraction of the sulfide-based solid electrolyte is about 20%, it is clear that the lithium ion conductivity of Example 2 is 190 times higher than Comparative Example 6.

The lithium ion conductivities of the composite solid electrolytes of Examples 3 and 11, in both of which the volume fraction of the sulfide-based solid electrolyte is about 30%, were compared to the lithium ion conductivities of the composite solid electrolytes of Comparative Examples 3 and 8, in both of which the volume fraction of the sulfide-based solid electrolyte is about 30%. Therefore, it is clear that the lithium ion conductivity of Example 3 is 55 times higher than Comparative Example 3 and 110 times higher than Comparative Example 8. It is also clear that the lithium ion conductivity of Example 11 is 45 times higher than Comparative Example 3 and 90 times higher than Comparative Example 8.

As a result of comparing the lithium ion conductivities of the composite solid electrolytes of Example 4 and Comparative Example 9, in both of which the volume fraction of the sulfide-based solid electrolyte is 40%, it is clear that the lithium ion conductivity of Example 4 is 39 times higher than Comparative Example 9.

Therefore, as shown in FIG. 4, the composite solid electrolyte according to the disclosed embodiments, in which the volume fraction of the sulfide-based solid electrolyte containing the lithium halide is more than 5% and less than 50%, is expected to increase lithium ion conductivity 10 or more times higher than a prior-art composite solid electrolyte using a sulfide-based solid electrolyte having the same volume and not containing a lithium halide.

Also, the lithium ion conductivities of the composite solid electrolytes of Examples 3 and 11, in both of which the volume fraction of the sulfide-based solid electrolyte is 30%, were compared to the lithium ion conductivity of the composite solid electrolyte of Comparative Example 3, in which the volume fraction of the sulfide-based solid electrolyte is 30%. As described above, it is clear that the lithium ion conductivity of Example 3 is 55 times higher than Comparative Example 3, and the lithium ion conductivity of Example 11 is 45 times higher than Comparative Example 3.

Therefore, it is clear that the composite solid electrolyte using the sulfide-based solid electrolyte that contains LiBr and/or LiI, is able to increase the lithium ion conductivity 45 to 55 times higher than a prior-art composite solid electrolyte using a sulfide-based solid electrolyte having the same volume and not containing a lithium halide. Therefore, it is supposed that, like the composite solid electrolyte using the sulfide-based solid electrolyte that contains LiBr and/or LiI, even the composite solid electrolyte using the sulfide-based solid electrolyte that contains LiF and/or LiCl, can also increase lithium ion conductivity.

As disclosed in paragraph 0060 in the description of WO2012/176808, as for the lithium ion conductivities of oxide-based solid electrolytes, while the lithium ion conductivity of $Li_7La_3Zr_2O_{12}$ containing Zr is $2.0 \times 10^{-4}$ S/cm, the lithium ion conductivity of $Li_5La_3Nb_2O_{12}$ containing Nb is $6.0 \times 10^{-5}$ S/cm. From this fact, it is clear that the lithium ion conductivity of $Li_7La_3Zr_2O_{12}$ is higher than $Li_5La_3Nb_2O_{12}$.

However, as shown in Table 1 and FIG. 4, as a result of comparing the lithium ion conductivities of the composite solid electrolytes of Examples 6 and 8, it is clear that the lithium ion conductivity of the composite solid electrolyte of Example 8, in which $Li_5La_3Nb_2O_{12}$ containing Nb is used as the oxide-based solid electrolyte, is higher than the composite solid electrolyte of Example 6, in which $Li_7La_3Zr_2O_{12}$ containing Zr is used as the oxide-based solid electrolyte.

It is supposed that this is because the interface between the oxide and the sulfide gets better by containing Nb. However, it is supposed that when the Nb content is too large, the performance of the oxide may decrease.

The invention claimed is:

1. A composite solid electrolyte comprising an oxide-based solid electrolyte and a sulfide-based solid electrolyte, wherein the oxide-based solid electrolyte is $(Li_{7-3Y-Z}, Al_Y)(La_3)(Zr_{2-Z}, M_Z)O_{12}$ (where M is Nb; Y is a number in a range of $0 \leq Y < 0.22$; and Z is a number in a range of $0 < Z < 2$), wherein the sulfide-based solid electrolyte is $VLiX$-$(1-V)((1-W)Li_2S$-$WP_2S_5)$ (where X is I; V is a number in a range of $0 < V < 1$; and W is a number in a range of $0.125 \leq W \leq 0.30$), wherein a mixing ratio of the sulfide-based solid electrolyte in the composite solid electrolyte is 10 volume % or more and 50 volume % or less, and wherein a mixing amount of the oxide-based solid electrolyte in the composite solid electrolyte is 50 volume % or more and 90 volume % or less.

2. The composite solid electrolyte according to claim 1, wherein the sulfide-based solid electrolyte is $0.2LiI$-$0.8$ $(0.75Li_2S$-$0.25P_2S_5)$.

* * * * *